(12) United States Patent
Kadowaki et al.

(10) Patent No.: US 6,618,218 B1
(45) Date of Patent: Sep. 9, 2003

(54) DISPLACEMENT DETECTING APPARATUS AND INFORMATION RECORDING APPARATUS

(75) Inventors: Hidejiro Kadowaki, Yokohama (JP); Ko Ishizuka, Omiya (JP); Yasushi Kaneda, Urawa (JP); Shigeki Kato, Utsunomiya (JP); Takayuki Kadoshima, Utsunomiya (JP); Sakae Horyu, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/655,342

(22) Filed: Sep. 5, 2000

(30) Foreign Application Priority Data

Sep. 7, 1999 (JP) ............................................. 11-253544

(51) Int. Cl.[7] ............................................. G11B 5/596
(52) U.S. Cl. ................................ 360/77.03; 369/13.11; 369/13.12; 356/453
(58) Field of Search ....................... 360/77.03; 356/453, 356/479, 482, 488, 494, 499, 411; 369/13.11, 13.12, 13.2, 110.02, 112.04, 112.07, 112.09, 112.19, 112.21, 112.26

(56) References Cited

U.S. PATENT DOCUMENTS

| | | | | |
|---|---|---|---|---|
| 4,641,296 A | * | 2/1987 | Mizunoe et al. | 369/44.23 |
| 4,654,839 A | * | 3/1987 | Endo | 369/44.24 |
| 4,742,218 A | * | 5/1988 | Nakamura et al. | 250/201.5 |
| 4,775,966 A | * | 10/1988 | Miura et al. | 369/44.32 |
| 4,785,438 A | * | 11/1988 | Mizunoe | 369/13.29 |
| 5,026,623 A | | 6/1991 | Imataki et al. | 430/270 |
| 5,043,835 A | * | 8/1991 | Watanabe et al. | 360/294.7 |
| 5,067,813 A | | 11/1991 | Ishizuka et al. | 356/351 |
| 5,158,859 A | | 10/1992 | Imatake et al. | 430/271 |
| 5,504,722 A | * | 4/1996 | Tanaka et al. | 369/13.32 |
| 5,534,693 A | | 7/1996 | Kondo et al. | 250/237 |
| 5,568,337 A | | 10/1996 | Eguchi et al. | 360/78.11 |
| 5,647,049 A | * | 7/1997 | Odaka et al. | 386/124 |
| 5,930,066 A | | 7/1999 | Ishizuka et al. | 360/77.03 |

FOREIGN PATENT DOCUMENTS

EP           903559 A2 *  3/1999   ............ G01B/9/02

* cited by examiner

Primary Examiner—Richemond Dorvil
Assistant Examiner—Jason Olson
(74) Attorney, Agent, or Firm—Fitzpatrick, Cella, Harper & Scinto

(57) ABSTRACT

An apparatus for detecting the relative displacement of a surface to be detected, and an apparatus and method for recording information on a hard disc of a hard disk drive using such a detecting apparatus, the detecting apparatus comprising an interference optical system for condensing a light beam on the surface to be detected, and making the reflected light from the surface to be detected interfere with the condensed light beam to thereby form an interference light beam, light receiving means for receiving the interference light beam and outputting bright and dark signals attributable to the relative displacement of the surface to be detected, and condensed light information supplying means for separating part of the reflected light from the surface to be detected from the optical path until the reflected light arrives at said light receiving means, and utilizing the separated light beam to detect the condensed state of the incident light beam onto the surface to be detected or make the condensed state observable.

22 Claims, 9 Drawing Sheets

FIG. 3A  FIG. 3B  FIG. 3C
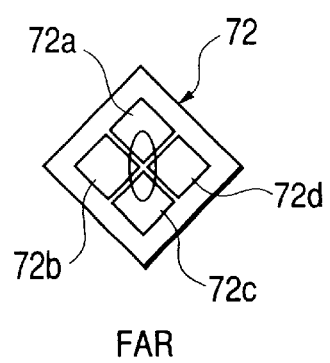
FAR
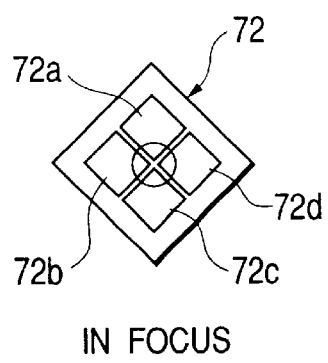
IN FOCUS
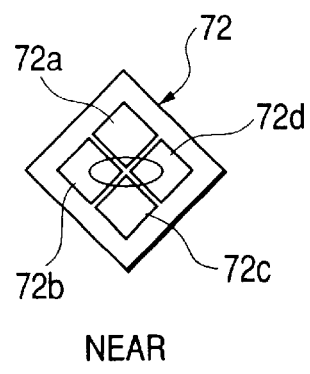
NEAR
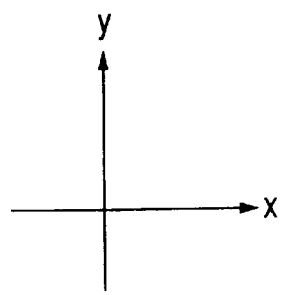

DISPLACEMENT DETECTING APPARATUS AND INFORMATION RECORDING APPARATUS

BACKGROUND OF THE INVENTION

1. Field of the Invention

The present invention relates to a displacement detecting apparatus capable of detecting a positional fluctuation of an object in a non-contact manner, where the positional displacement is minute displacement in the order of nanometers, and an information recording apparatus using such a displacement detecting apparatus.

2. Related Background Art

FIG. 1A of the accompanying drawings shows a perspective view of an information recording reproducing apparatus according to the prior art. The apparatus is comprised of a hard disc drive 1 for writing a servo track signal from a signal generator (SG) 48 into a hard disc, and a rotary positioner system 2 for effecting highly accurate rotary positioning. The hard disc drive 1 comprises a disc-shaped hard disc 3, a slider 4 having a magnetic head at its tip end, a magnetic head arm 5, a voice coil motor 6, a voice coil motor driver 7, a spindle 8, etc. Also, the rotary positioner system 2 comprises a push rod 9, a push rod arm 10, a positioning control motor 11, a rotary encoder 12 for detecting the amount of rotation of the rotary shaft of the control motor 11, a signal processor 13 for analyzing the detection output from the rotary encoder 12 and sending a positioning command signal to the servo track signal writing position of the magnetic head, a control motor driver 14 for driving the control motor 11 by the command signal of the signal processor 13, etc.

With such a construction, the writing and reading of magnetic information are effected on any track on the surface of the hard disc 3 being rotated at a high speed, by the arcuately operating magnetic head arm 5 through the magnetic head. At this time, in order to effect highly accurate positioning, the cylindrical surface of the push rod 9 is pushed against the side of the magnetic head arm 5, and the push rod arm 10 is rotated by the control motor 11 while feedback control is effected by the system of the rotary encoder 12, the signal processor 13 and the control motor driver 14, and positioning is effected while the magnetic head arm 5 is sequentially finely fed through the intermediary of the push rod 9. At this time, in order to effect contact reliably, usually some electric current is supplied to the voice coil motor 6 and pushing is also effected against the push rod 9 from the magnetic head arm 5 side.

FIG. 1B of the accompanying drawings shows a perspective view of another highly accurate positioning apparatus. This detecting apparatus is comprised of a laser source 15, mirrors 16, 17, a beam splitter 18, a retro-reflector 19, like a corner cube provided on a magnetic head arm 5, and a light receiving element 20. Movement of the magnetic head is measured with high accuracy not by the magnetic head arm 5 being mechanically pushed, but by optical means.

In this apparatus, by the utilization of a Michelson-type interferometer comprising the laser source 15, the mirrors 16, 17, the beam splitter 18 and the retro-reflector 19, the interference light of two light beams passed from the retro-reflector 19 via the mirror 16 and the mirror 17 is detected by the light receiving element 20, thereby to obtain positional information of the magnetic head arm 5. On the basis of the obtained detection signal, a signal processor 13 issues a command, and an electric current to be supplied to a voice coil motor 6 is controlled by a voice coil motor driver 7, thereby to directly move the magnetic head arm 5 and effect appropriate control.

FIG. 1C of the accompanying drawings shows a perspective view of the optical system of an optical-type sensor unit 20 according to the prior art, and in the optical-type sensor unit 20, there are successively arranged a multimode laser diode light source 21, a collimator lens 22, a non-polarizing beam splitter 23, and a probe-shaped polarizing prism 24 having a polarizing beam splitter surface 24a and a reference reflecting mirror surface 24b on which reflecting evaporated film is formed. In the reflecting direction of the non-polarizing beam splitter 23, there are arranged a quarter wavelength plate 25, a beam diameter limiting opening plate 26, a beam amplitude dividing diffraction grating 27 having staggered grating structure, polarizing plate analyzers 28a to 28d disposed with their polarization azimuths deviated by 45° from one another, and light receiving elements 29a to 29d.

With such a construction, divergent light from the multimode laser diode light source 21 is made into a loosely condensed light beam L by the collimator lens 22, and is transmitted through the non-polarizing beam splitter 23 and then passes through the probe-shaped polarizing prism 24, and is divided into polarized components in the polarizing beam splitter surface 24a. An S-polarized light beam reflected by the polarizing surface 24a emerges from the end surface of the probe-shaped polarizing prism 24 and is condensed near the beam waist of the measuring surface 5a of the magnetic head arm 5, and the reflected light thereof becomes a divergent spherical wave and passes along the original optical path and returns to the probe-shaped polarizing prism 24. On the other hand, a P-polarized light beam transmitted through the polarizing surface 24a is condensed at a position deviating from the beam waist on the reference reflecting mirror surface 24b in the end portion, and the reflected light thereof passes along the original path and likewise returns to the probe-shaped polarizing prism 24.

These two light beams are re-combined on the polarizing surface 24a of the probe-shaped polarizing prism 24 and become linearly polarized light beams orthogonal to each other, and do not directly interfere with each other and become bright and dark signals, but yet when these two light beams are reflected in the non-polarizing beam splitter 23 and transmitted through the quarter wavelength plate 25, the linearly polarized light beams orthogonal to each other are converted into oppositely circularly polarized light beams, and these two light beams have their vibration surfaces vector-combined and are re-converted into a linearly polarized light beam rotated by the fluctuation of the phase difference therebetween.

This rotated linearly polarized light beam is amplitude-divided into four light beams by the phase diffraction grating 27, and these four divisional light beams are transmitted through the polarizing plate analyzers 28a to 28d, whereby they are converted into interference light beams in which the timing of light and darkness shifts by 90° each in terms of phase, and are received by the respective light receiving elements 29a to 29d. On the basis of the light reception signals of these light receiving elements 29a to 29d, a minute fluctuation of the position of the measuring surface 5a of the magnetic head arm 5 is detected with high accuracy of 1 nm or less.

In the above-described rotary positioner system 2 of FIG. 1A, however, vibration due to rotation or the like of the hard disc 3 is transmitted to the magnetic head arm 5, and is further transmitted to the control motor 11 through the cylindrical surface of the push rod 9. Therefore, highly accurate positioning is hindered and the capability of writing information such as a high-density servo track signal is reduced. For this reason, as a method of detecting minute displacement, there is known an electrostatic capacity sensor or the like utilizing impedance, e.g. electrostatic capacity, between the measuring surface 5a of the magnetic head arm 5 and the push rod 9 of the measuring probe. However, in this case there is a problem in that, if the area of the measuring surface 5a is small, the measuring resolving power will be reduced and the output will drift.

Also, in the above-described optical positioning apparatus of FIG. 1B, it is necessary to place the retro-reflector 19 like a corner cube on the magnetic head arm 5, and it requires much care to secure the space therefor and mount and dismount the retro-reflector. There also is a problem in that a control characteristic due to bulkiness and increased weight is aggravated, and is affected by an environmental fluctuation such as the fluctuation of air.

The optical type sensor unit of FIG. 1C is a useful one which has solved the above-noted problems peculiar to the prior art. In this unit, the sensor probe comprising the polarizing prism 24 is small and, therefore, the detecting position range thereof is as small as 100, $\mu$m or less. Further, the set position of the sensor probe is proximate to the measuring surface 5a of the magnetic head arm 5 and, therefore, it is necessary to adjust the direction and position of the sensor probe during the setting thereof, to look for an appropriate signal location, and to set the sensor probe so that the level of the signal may become greatest.

Also, when the direction of the measuring surface 5a is predetermined, there is adopted a method of supporting the sensor probe on an X stage or the like with its direction made substantially perpendicular to the measuring surface 5a, setting it in a direction to take in reflected light, approximating the sensor probe to the measuring surface 5a and looking for an appropriate signal location, and setting the sensor probe at the center of the range thereof. In this case, the detecting position range of the sensor probe is small and therefore, when the signal is to be caught to thereby determine the center of the signal, the sensor probe is gradually reciprocated several times. Outside the detecting position range, there is no signal from this sensor probe, and even within the detecting position range, the direction of the light condensing position cannot be known. Consequently, for example, to automatize measurement, a further improvement becomes necessary.

SUMMARY OF THE INVENTION

The present invention has been made in view of what has been described above, and an object thereof is to provide a displacement detecting apparatus capable of discriminating the position of the surface of reflecting means in which the surface of the reflecting means and polarizing separating means are in a proper positional relation.

Another object of the present invention is to provide a displacement detecting apparatus which can detect the position of an object with high reliability without providing a discrete member on the object side, and makes positioning of high accuracy and high resolving power possible.

Still another object of the present invention is to provide an information recording apparatus capable of writing a servo track signal highly accurately into a hard disc.

BRIEF DESCRIPTION OF THE DRAWINGS

FIGS. 3A, 3B and 3C are illustrations of the shape of a converged light on a four-division sensor.

DESCRIPTION OF THE PREFERRED EMBODIMENTS

The present invention will hereinafter be described in detail with reference to several embodiments thereof shown in FIGS. 2A, 2B, 3A to 3C and 4 to 6.

Figure 1A:
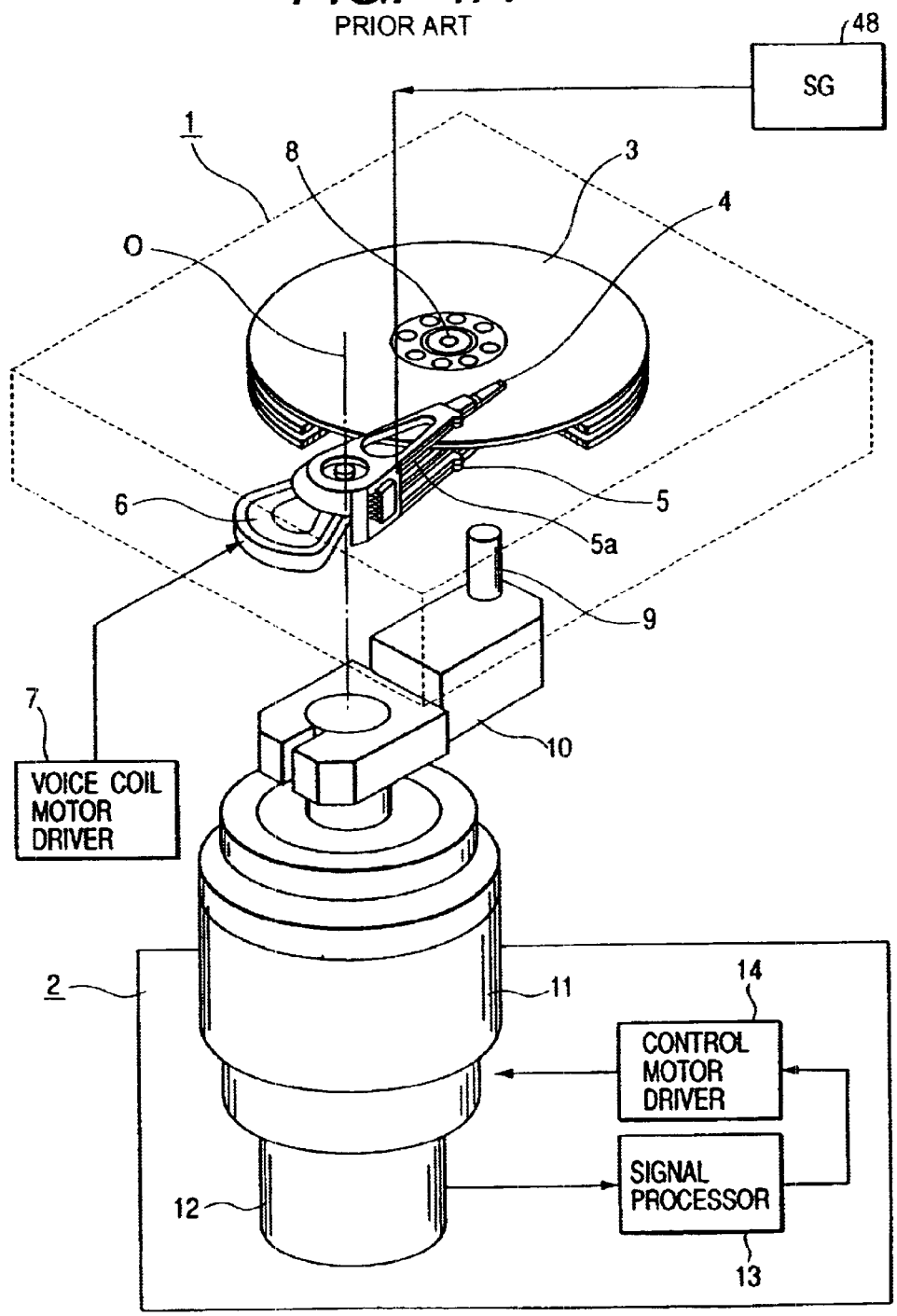
FIG. 1A is a perspective view of a servo track signal writing apparatus according to the prior art.
Figure 1B:
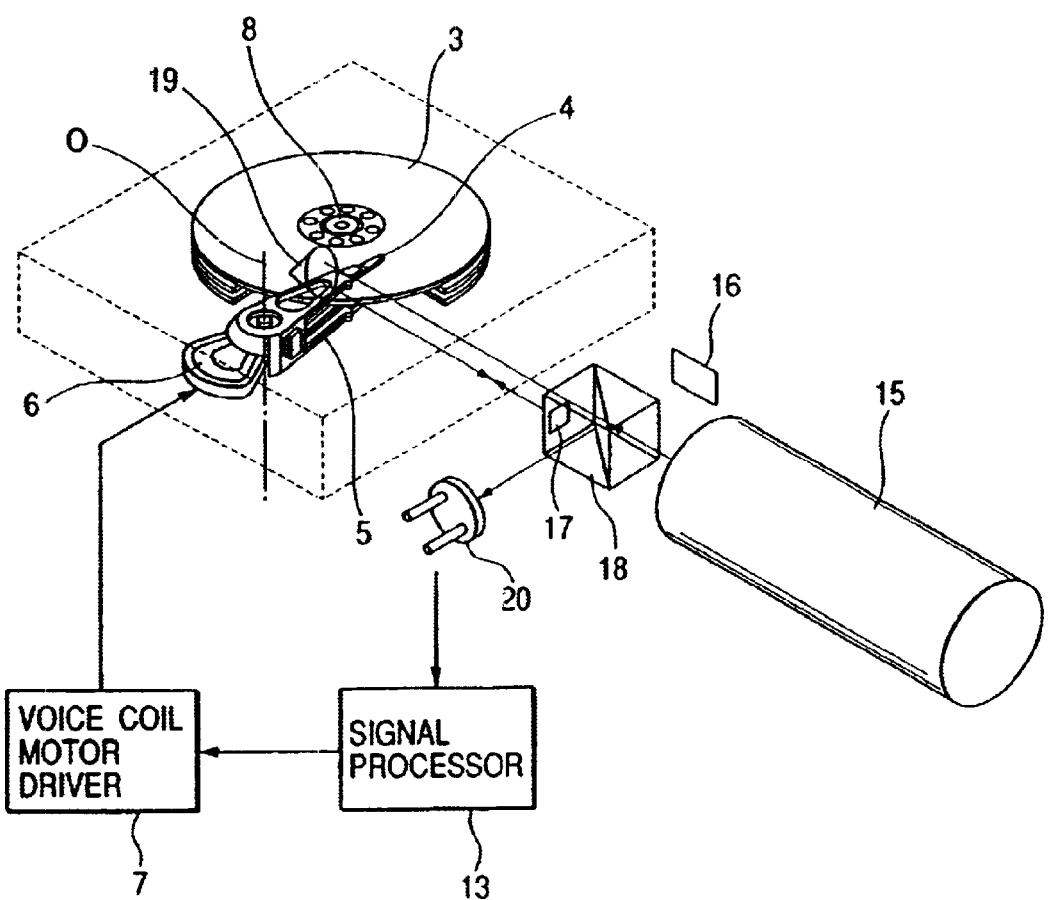
FIG. 1B is a perspective view of a sensor unit.
Figure 1C:
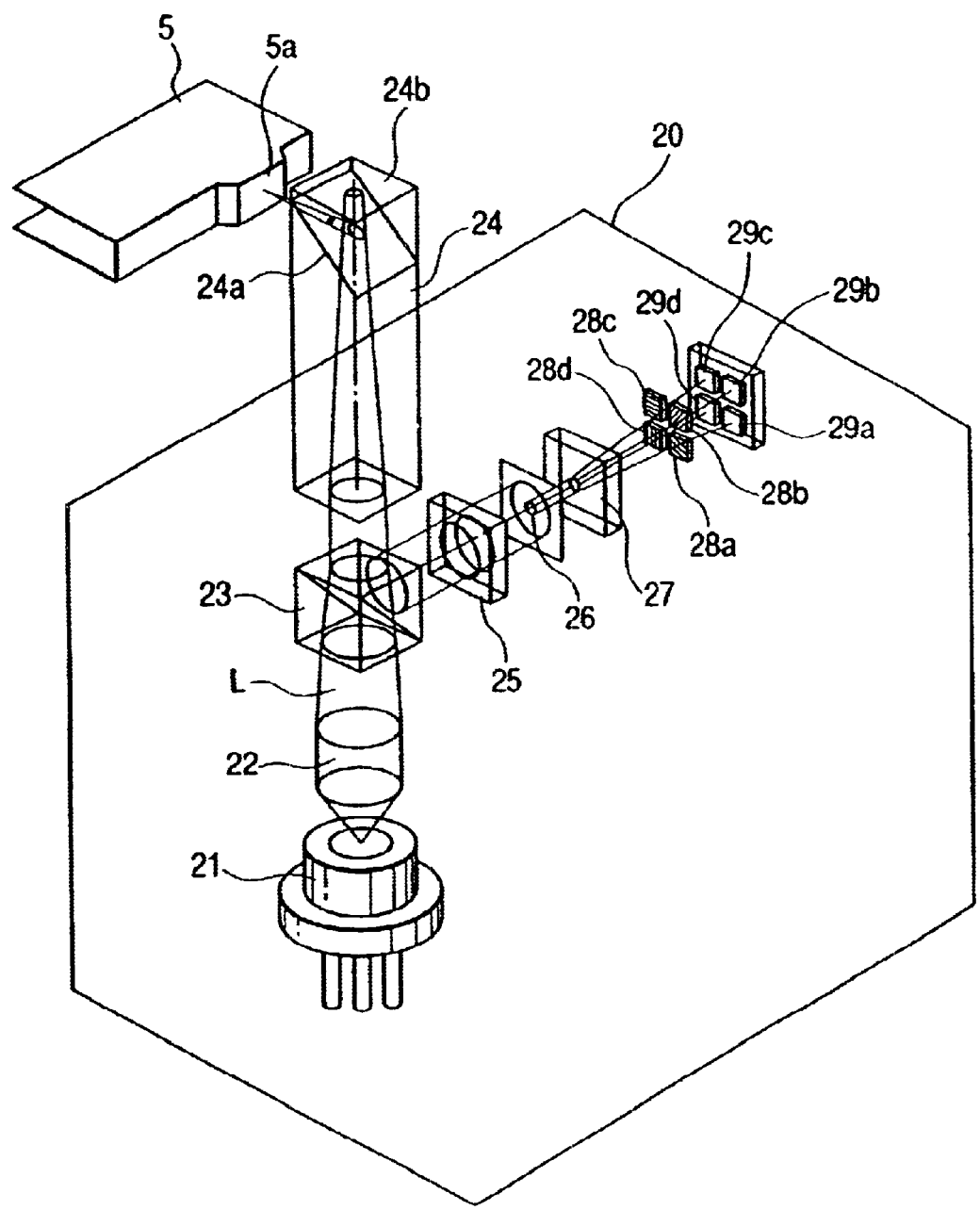
FIG. 1C is a perspective view of a non-contact distance sensor unit.
Figure 2A:
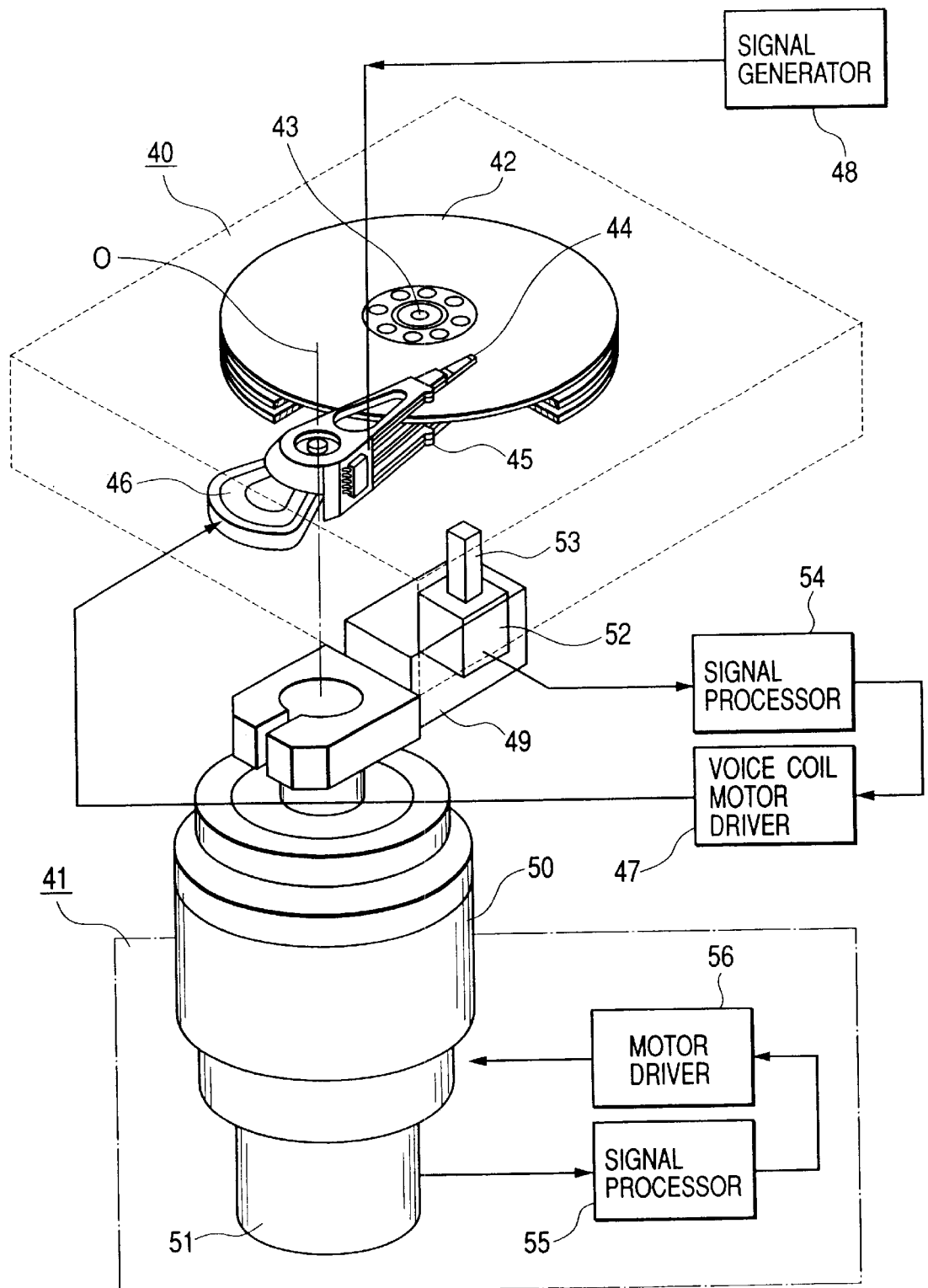
FIG. 2A is a perspective view of a servo track signal writing apparatus according to a first embodiment of the present invention.

FIG. 2A shows a perspective view of an information recording-reproducing apparatus according to a first embodiment of the present invention which is comprised of a hard disc drive 40 for writing in a servo track signal, and a rotary positioner unit 41 for effecting highly accurate rotation positioning. The hard disc drive 40 comprises a hard disc 42 having a magnetic recording medium vapor-deposited on the surface thereof, a spindle 43 providing the center of rotation of the hard disc 42, a magnetic head slider 44 having a magnetic head fixed thereto, a magnetic head arm 45 holding the magnetic head slider 44, a voice coil motor 46, etc.

The magnetic head arm 45 having a rotary shaft 0 is mounted outside the hard disc 42 normally rotated at a high speed about the spindle 43, the substantially rectangular parallelepiped-shaped magnetic head slider 44 is mounted on the tip end of the magnetic head arm 45, and the magnetic head on the tip end of the magnetic head slider 44 is disposed with a gap of 0.5, $\mu$m or less relative to the surface of the hard disc. The magnetic head is adapted to be arcuately moved in a substantially radial direction on and relative to the hard disc 42 by the rotation of the magnetic head arm 45. Also, the rotary shaft of the voice coil motor 46 is connected to the rotary shaft 0 of the magnetic head arm 45, and the output of a voice coil motor driver 47 is connected to the voice coil motor 46. The output of a signal generator 48 generating a signal to be written into the hard disc 42 is connected to the magnetic head of the magnetic head slider 44.

The rotary positioner unit 41 is disposed under the hard disc drive 40, and a probe supporting (positioning) arm 49, a motor 50 and a rotary encoder 51 of high resolving power are connected together coaxially with the rotary shaft 0 of the magnetic head arm 45. An optical type position detecting sensor unit 52 is mounted on the probe supporting arm 49, the optical sensor probe 53 of the position detecting sensor unit 52 is inserted in a slot-like opening, not shown, in the base plate of the hard disc drive 40, and the end surface of the tip end portion of the optical sensor probe 53 is disposed with a spacing of the order to 300 $\mu$m with respect to the side of the magnetic head arm 45. The output of the position detecting sensor unit 52 is connected to the voice coil motor drive 45 through a signal processor 54, and the probe supporting arm 49 is adapted to be rotatively moved about a rotary shaft coaxial with the rotary shaft 0 of the magnetic head arm 45. The output of the rotary encoder 51 is connected to the motor 50 through a signal processor 55 and a motor driver 56.

With such a construction, a servo track signal from the signal generator 48 is written as magnetic information from the magnetic head of the arcuately moved magnetic head arm 45 into any position (track) on the surface of the hard disc 42 being rotated at a high speed. At this time, the rotated position of the position detecting sensor unit 52 is detected by the rotary encoder 51, and on the basis of this detection data, the motor 50 is rotatively driven through the signal processor 55 and the motor driver 56. By the feedback control of this type, the position detecting sensor unit 52 is rotatively positioned.

The surface of the hard disc 42 is divided into a plurality of circular ring-shaped tracks of different radii concentric with the center of rotation thereof, and further, each of the plurality of circular ring-shaped tracks is divided into a plurality of arcs, and finally magnetic recording and reproduction are effected time-serially on the plurality of arcuate areas along the circumferential direction thereof.

To increase the recording capacity of the hard disc 42, it is necessary to make recorded information onto the hard disc 42 high in density, and to make the recorded information high in density, it is effective to narrow the width of the concentrically divided tracks to thereby improve the recording density in the radial direction. The recording density in the radial direction is represented by track density t/i (track/inch) per length of 1 inch, and the present day recording density is of the order of 10000 t/i, which means that the track interval is about 3 $\mu$m. In such a minute track pitch, it is necessary to position the magnetic head radially of the hard disc 42 with resolving power 0.05 $\mu$m which is about 1/50 of the track width, and write in servo track signals in advance. For this purpose, the technique of successively writing in servo track signals while effecting the positioning of high resolving power within a short time becomes necessary.

Figure 2B:
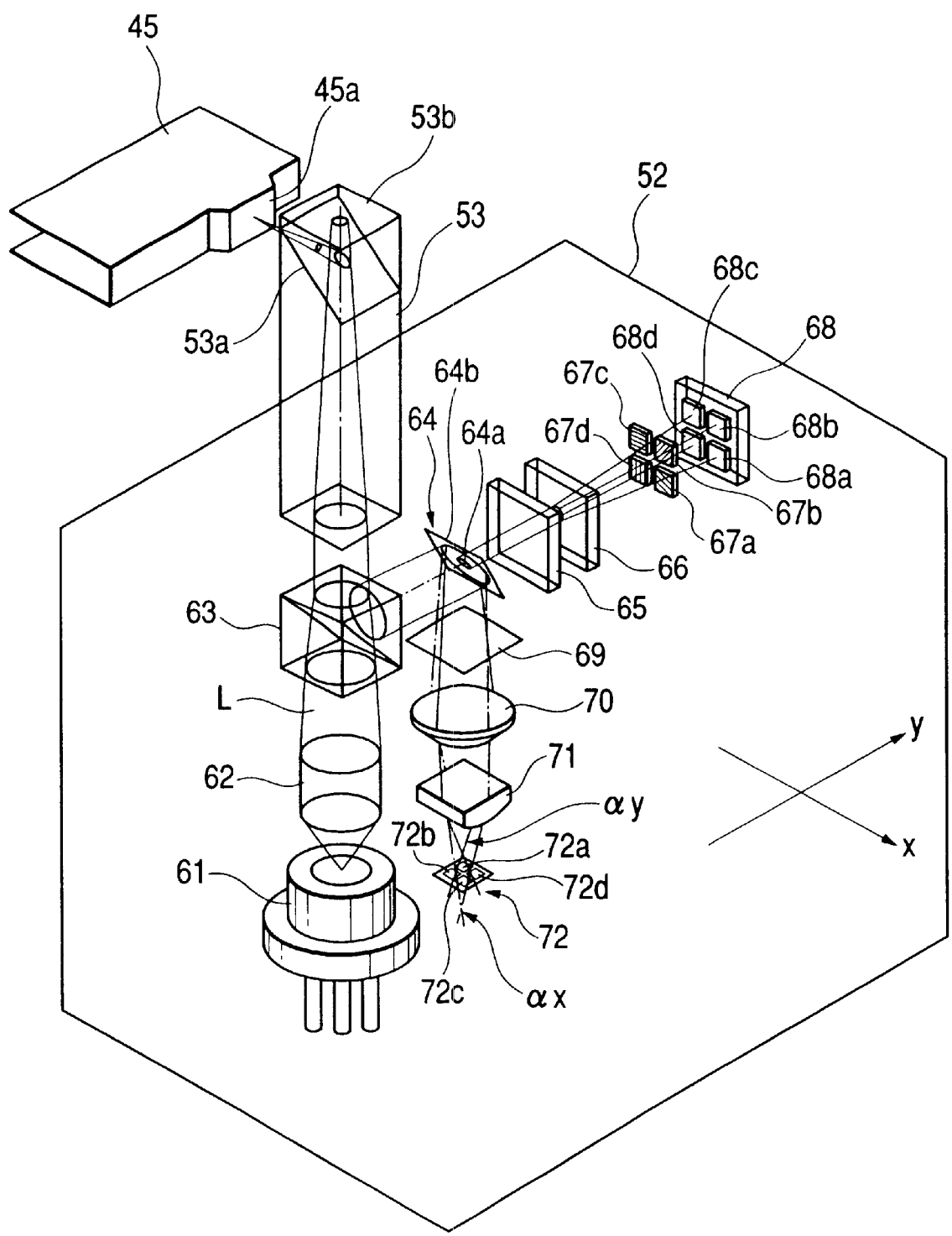
FIG. 2B is a perspective view of a non-contact distance sensor unit.

FIG. 2B shows a perspective view of the optical system of the position detecting sensor unit 52, and a multimode laser diode light source 61, a collimator lens 62 and the optical sensor probe 53 are successively arranged, and the sensor probe 53 is comprised of a polarizing prism having a polarizing beam splitter surface 53a and a reference reflecting mirror surface 53b formed with reflecting deposited film. In the reflecting direction of a non-polarizing beam splitter 63, there are successively arranged an aperture mirror 64 comprising a reflecting portion 64b having a beam diameter limiting opening 64a at the center thereof, a quarter wavelength plate 65, a beam amplitude dividing phase diffraction grating 66 having staggered grating structure, polarizing plate analyzers 67a to 67d disposed with their deflecting directions deviated by 45° from one another, and light receiving elements 68a to 68d.

Also, in the reflecting direction of the aperture mirror 64, there are arranged a polarizing plate 69 transmitting therethrough reflected light from the surface 45a to be measured on the side of the magnetic head arm 45 and intercepting a light beam reflected by the reference reflecting mirror surface 53b, a condensing lens 70, a cylindrical lens 71 and a four-division sensor 72, whereby a focus detecting optical system is formed.

With such a construction, the divergent light from the multimode laser diode light source 61 is made into a loosely condensed light beam L by the collimator lens 62, and this light beam L is transmitted through the non-polarizing beam splitter 63, and thereafter is divided into polarized components by the polarizing surface 53a of the sensor probe 53. An S-polarized light beam reflected by the polarizing surface 53a emerges from the end surface of the sensor probe 53 and is condensed near the beam waist of the surface 45a to be measured, and the reflected light thereof becomes a divergent spherical wave and passes along the original optical path and returns to the sensor probe 53. On the other hand, a P-polarized light beam transmitted through the polarizing surface 53b is incident on the reference reflecting mirror surface 53a on the end portion of the sensor probe 53 lying at a location deviating from the beam waist, and the reflected light thereof likewise returns to the sensor probe 53.

Here, the optical path lengths of the light beams in wave optics are set so as to be substantially equal lengths of optical paths within the coherent distance of the multimode laser diode light source 61. For example, when the width of the sensor probe 53 formed of glass is of the order of 2 mm, the light beam reflected by the polarizing surface 53a travels by 1 mm through the glass, and thereafter travels by 0.3 mm through the air and is illuminated onto the surface 45a to be measured on the side of the magnetic head arm 45. Accordingly, the reciprocal wave optical length of the optical path from the sensor probe 53 to the reflecting surface 45a to be measured is L1=(1×1.5+0.3)×2=3.6 mm, it being understood that the refractive index of the glass is 1.5. On the other hand, the light beam transmitted through the polarizing surface 53a travels by 1.2 mm through the glass, and is illuminated onto the reference reflecting mirror surface 53b on the end portion of the glass. Accordingly, the reciprocal wave optical length of the optical path is L2=(1.2×1.5)×2=3.6 mm.

Next, the beam waist which is the condensed position of the light beam is set to a position of 0.3 mm emerging from the sensor probe 53. Thereby, the position of the wave source of the divergent spherical wave reflected by the surface 45a to be measured and the reference reflecting mirror surface 53b appears to deviate in the direction of the optical axis. That is, looking into the interior of the sensor probe 53 from the laser diode light source 61 side, the condensing point (wave source) of the magnetic head arm 45 is seen at a position of LP=(1+0.3×1.5)=1.45 mm from the division surface of the sensor probe 53. On the other hand, the position of the divergent spherical wave source from the reference reflecting mirror surface 53b is seen at a position of L2'=1.2×2−1.45=0.95 mm from the beam dividing polarizing surface. However, both are positions seen in the glass.

Thus, both divergent spherical wave sources deviate by 0.5 mm from each other in the glass, and when the two light beams are superposed on each other, the wave fronts thereof do not completely coincide with each other, and when for example, the polarized lights of the two are combined together, concentric circular interference fringes are obtained. In that case, when the phases of the wave fronts of the two are fluctuated by the relative movement of the magnetic head arm 45, concentric circular interference fringes gush out or are drawn in from the center. As regards these concentric circular interference fringes, the interference fringe portion of substantially one color in the central portion is obtained wide because the amount of deviation between the two divergent spherical waves in the direction of the optical axis is as small as about 0.5 mm. Therefore, an appropriate opening 64a is provided in the aperture mirror 64 so as to take out only the substantially one-color portion, and by taking out part of the light beam, it becomes possible to handle the subsequent portion as a substantially plane wave.

The two light beams combined in the sensor probe 53 in this manner are linearly polarized lights orthogonal to each other and therefore, actually, do not directly interfere with each other and become bright and dark signals. However, when these two light beams are reflected in the non-polarizing beam splitter 63 and transmitted through the quarter wavelength plate 65, the linearly polarized lights orthogonal to each other are converted into circularly polarized lights of opposite directions, and the vibrating surfaces of the two are vector-combined, whereby by the fluctuation of the phase difference therebetween, they are converted into a rotating linearly polarized light.

This rotating linearly polarized light is amplitude-divided into four light beams by the phase diffraction grating 66. That is, by this amplitude division, all the light beams are entirely equally divided in their properties such as shape, intensity unevenness and defect and therefore, the influences they are given all become equal even if the interference fringes become not one color or are reduced in contrast for some reason or other. Particularly, in the reflected light from the magnetic head arm 45, the wave front is disturbed by minute uneven structure and intensity unevenness occurs strongly, but the ways of disturbance of the wave fronts and the states of intensity unevenness of the four light beams are all equal.

The light beams divided into four are transmitted through the polarizing plate analyzers 67a to 67d disposed with their polarization azimuths deviated by 45° from one another, whereby they are converted into interference lights of which the timing of light and the timing of darkness deviate by 90° from each other in terms of phase. In a state in which the reductions in contrast by the influences of the disturbance of the wave fronts and intensity unevenness are all equally influenced, respective light and dark light beams are received by the respective light receiving elements 68a to 68d.

The signals of the light receiving element 68a and the light receiving element 68b having a phase 25 difference of 180° therebetween are differentially detected, and this signal from which a DC component such as reduction in contrast due to disturbance or the like of the wave front has been substantially removed is defined as the A phase signal. Likewise, the signals of the light receiving element 68c and the light receiving element 68d having a phase difference of 180° therebetween are differentially detected, and this signal from which a DC component such as reduction in contrast due to disturbance or the like of the wave front has been substantially removed is defined as the B phase signal. The A phase signal and the B phase signal have a phase difference of 90° therebetween, and their Lissajous pattern observed by an oscilloscope in X-Y mode becomes circular. The size of the circle which is the amplitude of this Lissajous pattern fluctuates due to minute unevenness in the magnetic head arm 45, but the central position thereof does not fluctuate and therefore, no essential error occurs to the phase detection for measuring the relative distance.

Also, by the light being condensed on the side of the magnetic head arm 45, the influence of one color deviation which is the fluctuation of the interference state by the angular deviation of the side of the magnetic head arm 45 is avoided. That is, even if angular deviation due to light being condensed is present, the main emerging direction of the divergent spherical wave only somewhat deviates and the spherical wave itself being eclipsed is avoided, and the overlapping state of the wave fronts of the two divergent spherical waves does not change and therefore, the interference state is obtained stably. Accordingly, adjustment of the side of the magnetic head arm 45 and the illuminating light beam becomes unnecessary and this sensor unit can be obtained as an interference type position detecting sensor which is very easy to handle.

Further, the parallelism deviation of the illuminating position is not concerned in the phase deviation between the divergent spherical waves, but yet a minute change in the uneven state of the side of the magnetic head arm 45 conforming to the illuminating position results in the fluctuation of the amplitude of an interference signal. However, the central position of the Lissajous pattern does not fluctuate and therefore, no essential error occurs to the phase detection.

The positional relation between the magnetic head arm 45 and the optical type position detecting sensor unit 52 does not deviate as long as the distance between the two is kept constant, because both are rotatively moved about the same rotary shaft 0. In reality, completely the same shaft is impossible and therefore, when the two are rotating, the angular deviation and parallelism deviation of the relative positional relation occur due to a shaft deviation error, but in the present embodiment, no essential problem will arise even if the alignment deviation and parallelism deviation shown above occur.

The finally detected signal has its principle based on the gauge interference by the reciprocal optical path and is therefore a sine wave-like signal having a half of the wavelength of the laser diode light source 61 as its period. When a laser diode light source 61 having a wavelength of 0.78 $\mu$m is used, there is obtained a sine wave signal having a period of 0.39 $\mu$m, and by counting the wave number thereof, it is possible to detect the fluctuation of the relative distance. Also, there is obtained a sine wave signal of two phases having a phase difference of 90° therebetween and therefore, by electrically dividing the signal by the use of a conventional electrical phase dividing apparatus, it is possible to detect relative positional deviation of fine resolving power. That is, if the signal is electrically divided into 4096, the relative positional deviation can be detected by minimum 0.095 nm. Accordingly, if an electric current is supplied to the voice coil motor 46 for driving the magnetic head arm by an appropriate control apparatus so that the relative positional deviation may become zero, the relative position can be stably maintained by the order of several times as great as ±0.095 nm, that is, servo can be applied.

If use is made of a highly accurate rotary positioner unit 41 containing therein a rotary encoder 51 generating a sine wave signal of 81000 cycles per one full rotation, and capable of dividing the signal into 2048 and positioning, the sensor probe 53 of the position detecting sensor unit 52 mounted near the magnetic head arm 45 having a radius of 30 mm can be positioned with resolving power several times as great as ±1.4 nm. That is, the stability of the relative position of the position detecting sensor unit 52 itself is of the order of several times as great as ±0.095 nm as described above and therefore, the positioning resolving power of the two put together becomes about equal to the performance of the highly accurate rotary positioner unit 41 itself.

By adding to the highly accurate rotary positioner unit 41 a servo mechanism for keeping the position of the end surface of the magnetic head arm 45 constant by the use of the position detecting sensor unit 52, as described above, there can be accomplished stable and highly accurate positioning which is free of the influence of disturbance.

The interference between the reflected light beam from the side of the magnetic head arm 45 and the reflected light beam from the reference reflecting mirror surface 53b is obtained within the coherent distance of the multimode laser source 61. In the case of a laser diode light source 61 of a single mode, the coherent distance is long, but mode hop may be caused and the phenomenon of the interference phase hopping may occur and therefore, it is preferable to make the lengths of the optical paths substantially equal to each other by the use of the multimode laser source 61, and use it with an optical path length difference equal to or less than the coherent distance.

Generally, the full width of the coherent distance is given by $\lambda 0 \times 2/\Delta\lambda$ and therefore, if the center wavelength is $\lambda 0=780$ nm and the full width of a half value of the multimode spectrum envelope is $\Delta\lambda=6$ nm, the full width of the coherent distance is about $\pm 50\,\mu$m about the equal optical path length. Also, generally, the laser diode light source 61 has its wavelength fluctuated by the fluctuation of the ambient temperature. Taking a laser diode light source 61 having the center wavelength of 780 nm and a temperature coefficient of 0.06 nm/° C. as an example, when the optical path length difference $\Delta L=50\,\mu$m, the deviation of the measured value by the temperature fluctuation of 1° C. is of the order of −5 nm. If design is made such that the distance is kept constant in the vicinity of the peak of coherency, an optical path length difference of $\pm 10\,\mu$m can be realized, and the measurement error in that case is ±1 nm, and this value is accuracy sufficient as a servo track writer.

Generally, in a laser gauge interferometer, if the optical path is separate and the sensor probe 53 is exposed to air, the signal output is unstable due to fluctuation or the like. In the present embodiment, most of the interference optical path is a common optical path and is separated into two optical paths near the tip end of the sensor probe 53, but since the optical paths are short and in a glass medium, design is made such that the influence of fluctuation or the like becomes very small.

Also, the linearly polarized light beams reflected by the side of the magnetic head arm 45 and the reference reflecting mirror surface 53b are re-combined by the polarizing surface 53a of the sensor probe 53, and are reflected by the non-polarizing beam splitter 63, whereafter part of them is reflected by the reflecting portion 64b of the aperture mirror 64 and is sent to the focus detecting optical system. In the focus detecting optical system, only the reflected light from the side of the magnetic head arm 45 is first taken out by the deflecting plate 69, and by the condensing lens 70 and the cylindrical lens 71, the beam waist of the condensed illuminating light to the side of the magnetic head arm 45 is condensed at a condensing position $\alpha x$ determined by the condensing lens 70 with respect to a direction indicated by arrow x, and is condensed at a condensing position $\alpha y$ determined by the condensing lens 70 and the cylindrical lens 71 with respect to a direction indicated by arrow y. A position at which the sizes of the light beams in x direction and y direction become the same exists intermediately of these condensing positions $\alpha x$ and $\alpha y$, and the four-division sensor 72 is disposed at a position whereat the sizes of the light beams in x direction and y direction when the side of the magnetic head arm 45 is at the center of the beam waist become the same.

FIGS. 3A to 3C show the shape of the condensed illuminating light on the side of the magnetic head arm 45 on the four-division sensor 72. When the side of the magnetic head arm 45 is at the center of the beam waist of the condensed illuminating light, the shape of the condensed illuminating light beams circular as shown in FIG. 3B, and when the side of the magnetic head arm 45 approaches the sensor probe 53, a point $\alpha y$ approaches the four-division sensor 72 and a point $\alpha x$ goes away from the four-division sensor 72 and as a result, the shape of the conveyed light on the side of the magnetic head arm 45 on the four-division sensor 72 becomes an ellipse long sideways in the x direction as shown in FIG. 3C. When, conversely, the side of the magnetic head arm 45 goes away from the sensor probe 53, the shape of the converged light becomes a vertically long ellipse as shown in FIG. 3A.

When an error signal $(72a+72c)-(72b+72d)$ is calculated from the outputs of the four areas $72a$–$72d$ of the four-division sensor 72, this value becomes O at the in-focus point, and becomes smaller than O when the side of the magnetic head arm 45 approaches the sensor probe 53, and becomes greater than O when the side of the magnetic head arm 45 goes away from the sensor probe 53. From this error signal $(72a+72c)-(72b+72d)$, it can be determined whether the side of the magnetic head arm 45 is set at a measuring position, or if it deviates from the measuring position, i.e., whether it is near or far can be discriminated. Further, from the overall output $(72a+72b+72c+72d)$ of the four areas $72a$–$72d$ of the four-division sensor 72, it can be determined whether the direction of the side of the magnetic head arm 45 is properly set.

The position detecting sensor unit 52 is arranged based on light interference as its principle and can therefore detect positional displacement with high resolving power by a sine wave-like signal, but when in FIG. 2A, the optical sensor probe 53 of the position detecting sensor unit 52 mounted on the probe supporting arm 49 is disposed near the side of the magnetic head arm 45, the detection range is as small as 100 $\mu$m or less and the absolute position is not known and therefore, the optical sensor probe 53 needs to be correctly set at a location from which a signal is output.

Therefore, the present embodiment adopts two steps. In a first step, the motor 50 or the voice coil motor 46 is controlled and driven by the error signal $(72a+72c)-(72b+72d)$ from the focus detecting optical system, and the optical sensor probe 53, or the side of the magnetic head arm 45, is controlled so that the condensed illuminating light may be the center of the beam waist on the side of the magnetic head arm 45. At this time, by checking the overall output $(72a+72b+72c+72d)$ of the four areas $72a$–$72d$ of the four-division sensor 72, it can be determined whether the direction of the side of the magnetic head arm 45 is properly set.

Next, as a second step, the relative position of the optical sensor probe 53 and the side of the magnetic head arm 45 is detected by the position detecting sensor unit 52 using light interference, and the positioning of the rotary positioner unit 41 is effected in such a manner that the movement of the rotary positioner unit 41 and the movement of the side of the magnetic head arm 45 are operatively associated with each other in non-contact while the voice coil motor 46 is controlled so that the relative position may become constant, whereby a servo track signal is stably written into the hard disc 42.

Figure 4:
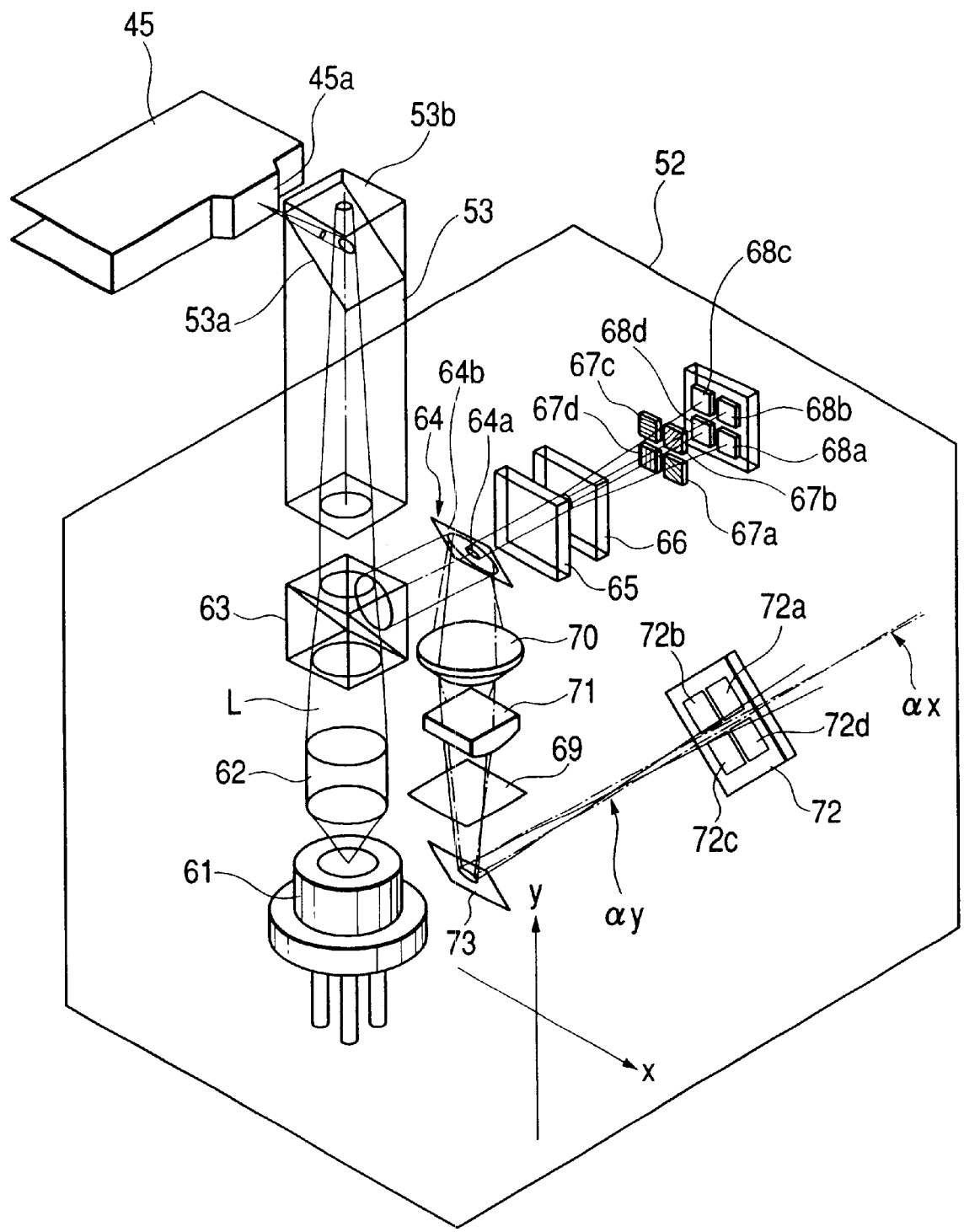
FIG. 4 is a perspective view of a non-contact distance sensor unit according to a second embodiment of the present invention.

FIG. 4 shows a second embodiment of the present invention, and in FIG. 4, the same reference numerals as those in the first embodiment designate the same members as those in the first embodiment. A polarizing plate 69, a condensing lens 70 and a cylindrical lens 71 are disposed in the reflecting direction of the reflecting portion 64b of an aperture mirror 64, and design is made such that a light beam is turned back by a mirror 73, the image plane distance is lengthened to thereby make the image magnification great and the condensed shape onto the four-division sensor 72 becomes large.

While the present embodiments uses a method of deviating the focus position relative to x and y directions using the cylindrical lens 71 when focus detection is effected, and detecting the focus state using the shape of the light beam in the four-division sensor 72, other conventional focus detection methods may also be used.

Figure 5:
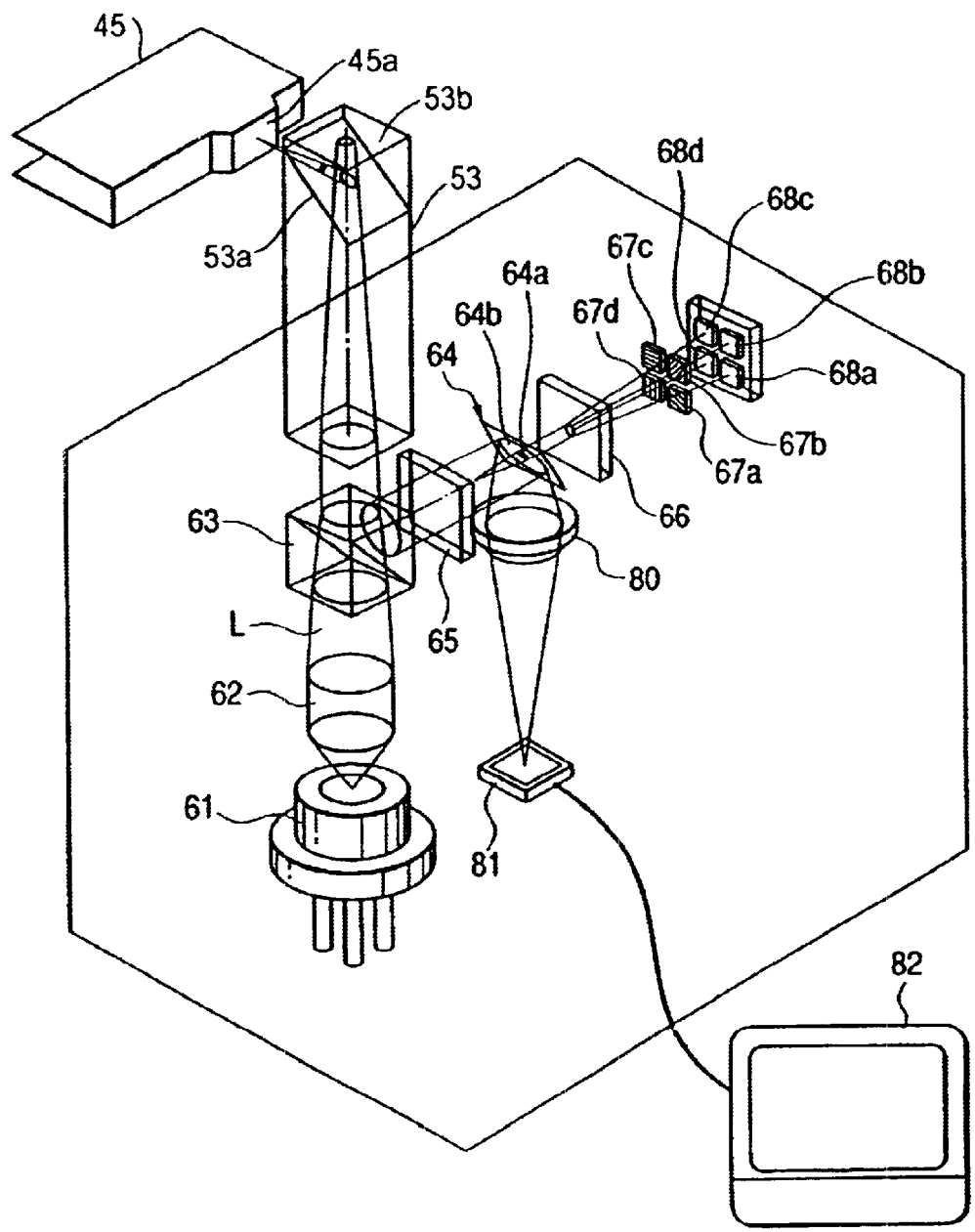
FIG. 5 is a perspective view of a non-contact distance sensor unit according to a third embodiment of the present invention.

FIG. 5 shows a third embodiment of the present invention which is designed such that the beam waist of the converged light to the side of the magnetic head arm 45 is reflected by the reflecting portion 64b of the aperture mirror 64, and is imaged on a two-dimensional sensor 81 by an imaging lens 80. The output of this two-dimensional sensor 81 is displayed on a display monitor 82, and the quantity of reflected light and the imaged state are observed to thereby effect the check-up of a proper position.

Figure 6:
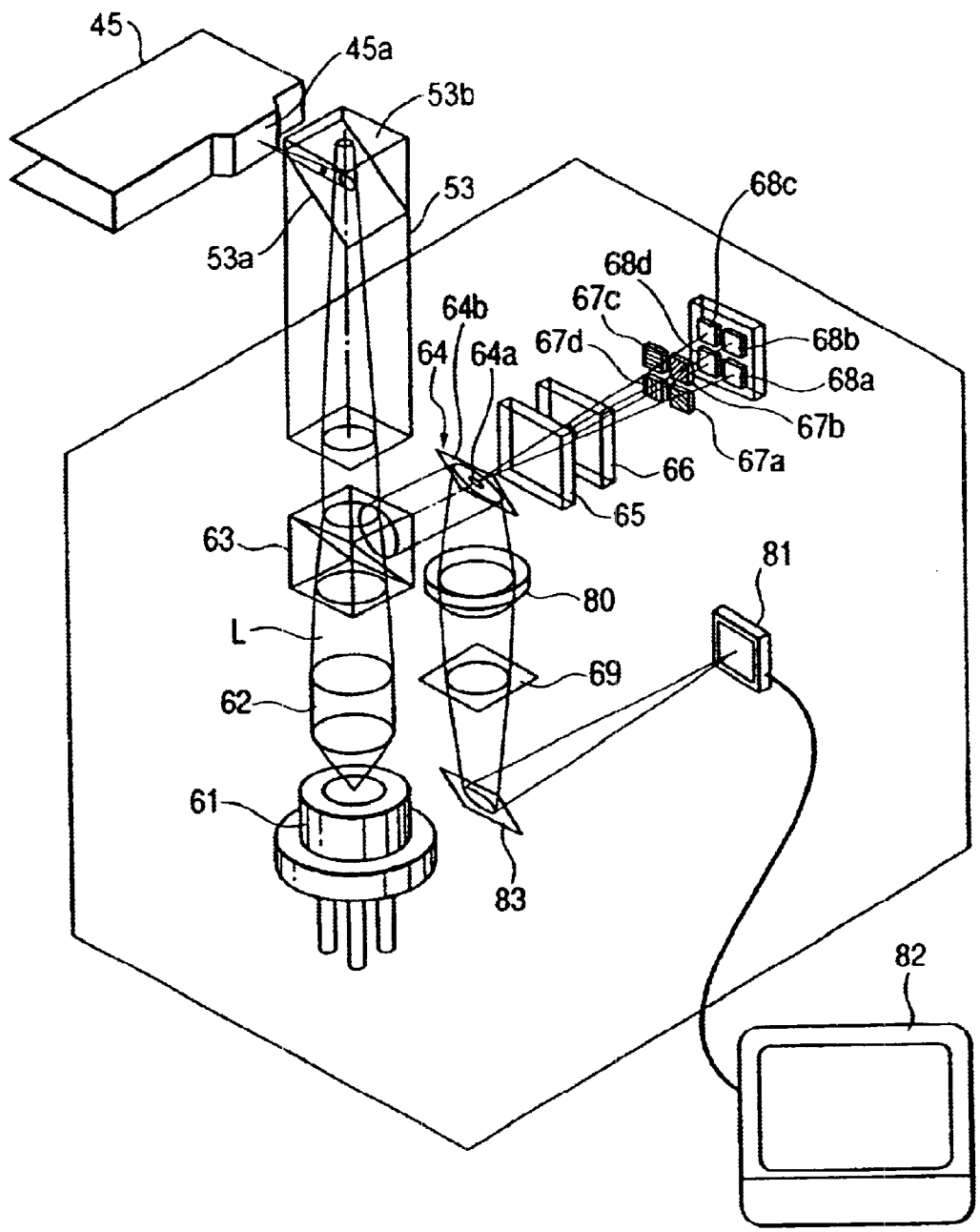
FIG. 6 is a perspective view of a non-contact distance sensor unit according to a fourth embodiment of the present invention.

FIG. 6 shows a fourth embodiment of the present invention, in which in order to intercept a light beam reflected by the reference reflecting mirror surface 53b, the aperture mirror 64 is disposed in front of the quarter wavelength plate 65, and the polarizing plate 69 is disposed in a direction to transmit therethrough the reflected light from the side of the magnetic head arm 45 and intercept the light beam reflected from the reference reflecting mirror surface 53b. The light beam is turned back by a mirror 83, and the image plane distance is lengthened and the image magnification is made great so that the output from the two-dimensional sensor may be easier to observe.

As described above, in a displacement detecting apparatus, provision is made of the function of using a part of the reflected light from relatively moved reflecting means to detect the condensed state of the light beam on the surface of the relatively moved reflecting means, whereby it is possible to detect any position change with high reliability without attaching thereto any special index or the like, and by the use of other excess light beam for the detection of the position displacement of the light beam being used by the sensor unit utilizing interference, the positional relation with the relatively moved reflecting means and the propriety of the direction can be known, and the setting of the optical sensor probe can be effected easily.

Also, in another displacement detecting apparatus, provision is made of the function of using a part of the reflected light from relatively moved reflecting means to make a state in which the light beam is condensed on the surface of the relatively moved reflecting means observable, whereby position displacement can be detected with high reliability and also, a proper position and a proper posture can be set easily.

In an information recording apparatus, rotary means is given the head arm position displacement detecting function and the function of detecting the condensed state of light condensed on the side of a head arm, and design is made such that the movement of the head arm is operatively associated with the positional fluctuation of the rotary means in non-contact, whereby by the use of an excess light beam which does not affect the interference light beam detection of reflected light obtained by measuring light emitted from a light source being applied to a rotating object, the absolute positions of the rotating object and an interferometer can be automatically detected, and during each positioning, a servo track signal can be stably written into a hard disc and therefore, high accuracy can be realized.

What is claimed is:

1. A displacement detecting apparatus for detecting displacement relative to a relatively moved portion to be detected, comprising:

a polarizing separation element for dividing a condensed light beam to thereby produce two linearly polarized light beams of which the planes of polarization are orthogonal to each other, directing one of the linearly polarized light beams onto said portion to be detected, and combining a light beam reflected from said portion to be detected with the other linearly polarized light beam;

a wavelength plate for producing a linearly polarized light beam of which the polarization azimuth changes in conformity with the phase difference of the wave front thereof, from the two linearly polarized light beams combined together by said polarizing separation element;

an amplitude dividing element for amplitude-dividing the linearly polarized light beam from said wavelength plate into a plurality of light beams;

a plurality of analyzers disposed at positions where corresponding one of the light beams amplitude-divided by said amplitude dividing element passes with their polarization azimuths deviated from one another;

a group of light receiving elements each of which receives the light beam from corresponding one of said analyzers, bright and dark signals having their phases deviated from each other being obtained from each of the light receiving elements by said light reception, the relative displacement information of said portion to be detected being obtained from said bright and dark signals;

an opening member for selectively passing therethrough part of the wave fronts of the two linearly polarized light beams combined together by said polarizing separation element, the light passed through said opening member travelling toward said group of light receiving elements; and a light detecting element for receiving the reflected light beam from said opening member, the focused state of said one linearly polarized light beam on said portion to be detected being detected by said light reception.

2. The apparatus of claim 1, wherein by the light reception of said light detecting element, the condensed position of said one linearly polarized light beam on said portion to be detected is detected and the information of the direction of said portion to be detected is also obtained.

3. The apparatus of claim 1, further comprising a polarizing element disposed on this side of said light detecting element so as to transmit therethrough only said linearly polarized light beam of said reflected light beam.

4. The apparatus of claim 1, further comprising a multimode laser diode, and wherein said polarizing separation element divides a light beam from said multimode laser diode, and the difference between the lengths of the respective optical paths in wave optics until the two linearly polarized light beams divided by said polarizing separation element are combined together by said polarizing separation element is set so as to be within the coherence length of said multimode laser diode.

5. The apparatus of claim 1, further comprising a nonpolarizing separation element disposed at a position in front of said polarizing separation element on an optical path of the light beam incident on said polarizing separation element, and wherein the two linearly polarized light beams combined together by said polarizing separation element are directed to an optical path in a direction differing from the optical path before they enter said non-polarizing separation element to thereby make said combined two linearly polarized light beams enter said analyzers.

6. The apparatus of claim 1, wherein said light detecting element has a four-division sensor, and further has an anamorphic optical system on this side of said four-division sensor.

7. The apparatus of claim 6, wherein said anamorphic optical system has a condensing lens and a cylindrical lens.

8. The apparatus of claim 6, further comprising a mirror between said anamorphic optical system and said four-division sensor.

9. A displacement detecting apparatus for detecting displacement relative to a relatively moved portion to be detected, comprising:

a polarizing separation element for dividing a condensed light beam to thereby produce two linearly polarized light beams of which the planes of polarization are orthogonal to each other, directing one of the linearly polarized light beams onto said portion to be detected, and combining a light beam reflected from said portion to be detected with the other linearly polarized light beam;

a wavelength plate for producing a linearly polarized light beam of which the polarization azimuth changes in conformity with the phase difference of the wave front thereof, from the two linearly polarized light beams combined together by said polarizing separation element;

an amplitude dividing element for amplitude-dividing the linearly polarized light beam from said wavelength plate into a plurality of light beams;

a plurality of analyzers disposed at positions where corresponding one of the light beams amplitude-divided by said amplitude dividing element passes with their polarization azimuths deviated from one another;

a group of light receiving elements each of which receives the light beam from corresponding one of said analyzers, bright and dark signals having their phases deviated from each other being obtained from each of the light receiving elements by said light reception, the relative displacement information of said portion to be detected being obtained from said bright and dark signals;

an opening member for selectively passing therethrough part of the wave fronts of the two linearly polarized light beams combined together by said polarizing separation element, the light passed through said opening member travelling toward said group of light receiving elements; and an observation system for directing the reflected light beam from said opening member by an optical system, the focused state of said one linearly polarized light beam on said portion to be detected becoming observable by means of said observation system.

10. The apparatus of claim 9, wherein said observation system has a polarizing element disposed so as to transmit therethrough only said one linearly polarized light beam of said reflected light beam.

11. The apparatus of claim 9, further comprising a multimode laser diode, and wherein said polarizing separation element divides a light beam from said multimode laser diode, and the difference between the lengths of the respective optical paths in wave optics until the two linearly polarized light beams divided by said polarizing separation element are combined together by said polarizing separation element is set so as to be within the coherence length of said multimode laser diode.

12. The apparatus of claim 9, further comprising a non-polarizing separation element disposed at a position in front of said polarizing separation element on an optical path of the light beam incident on said polarizing separation element, and wherein the two linearly polarized light beams combined together by said polarizing separation element are directed to an optical path in a direction differing from the optical path before they enter said non-polarizing separation element to thereby make said combined two linearly polarized light beams enter said analyzers.

13. The apparatus of claim 9, wherein said observation system has a two-dimensional sensor and a monitor, and image-picks up the light beam directed by said optical system by said two-dimensional sensor and displays on said monitor.

14. The apparatus of claim 13, wherein said optical system has a mirror between said opening member and said two-dimensional sensor.

15. An apparatus for recording information on a hard disc in a hard disc drive, comprising:

a polarizing separation element for dividing a condensed light beam to thereby produce two linearly polarized light beams of which the planes of polarization are orthogonal to each other, directing one of the linearly polarized light beams to the side of the head arm of said hard disc drive, and combining a light beam reflected from the side of said head arm with the other linearly polarized light beam;

a wavelength plate for producing a linearly polarized light beam of which the polarization azimuth changes in conformity with the phase difference of the wave front thereof, from the two linearly polarized light beams combined together by said polarizing separation element;

an amplitude dividing element for amplitude-dividing the linearly polarized light beam from said wavelength plate into a plurality of light beams;

a plurality of analyzers disposed at positions where corresponding one of the light beams amplitude-divided by said amplitude dividing element passes with their polarization azimuths deviated from one another;

a group of light receiving elements each of which receives the light beam from corresponding one of said analyzers, bright and dark signals having their phases deviated from each other being obtained from each of the light receiving elements by said light reception;

an opening member for selectively passing therethrough part of the wave fronts of the two linearly polarized light beams combined together by said polarizing separation element, the light passed through said opening member travelling toward said group of light receiving elements;

a light detecting element for receiving the reflected light from said opening member, the focused state of said one linearly polarized light beam on the side of said head arm being detected by said light reception;

a control system for positioning said polarizing separation element relative to said head arm by the utilization of the output of said light detecting element, and positioning said head arm relative to said polarizing separation element by the utilization of the bright and dark signals from said group of light receiving elements; and a signal system for writing a servo track signal into the hard disc from the recording head of said head arm positioned by said control system.

16. The apparatus of claim 15, further comprising a multimode laser diode, and wherein said polarizing separation element divides a light beam from said multimode laser diode, and said control system positions said polarizing separation element relative to said head arm so that the difference between the lengths of the respective optical paths in wave optics until the two linearly polarized light beams divided by said polarizing separation element are combined together by said polarizing separation element may be within the coherent distance of said multimode laser diode.

17. An apparatus for detecting the relative displacement of a surface to be detected, comprising:

an interference optical system for condensing a light beam on said surface to be detected, and making the reflected light from said surface to be detected interfere with the condensed light beam to thereby form an interference light beam;

light receiving means for receiving said interference light beam and outputting bright and dark signals attributable to the relative displacement of said surface to be detected; and condensed light information supplying means for separating part of the reflected light from said surface to be detected from the optical path until said reflected light arrives at said light receiving means, and utilizing said separated light beam to detect the condensed state of the incident light beam onto said surface to be detected or make said condensed state observable.

18. The apparatus of claim 17, further comprising an opening member disposed in the optical path until the reflected light from said surface to be detected arrives at said light receiving means, and wherein said condensed light information supplying means utilizes the reflected light from said opening member.

19. An apparatus for recording information on a hard disc in a hard disc drive, comprising:

an interference optical system for condensing a light beam on a side surface of a head arm in said hard disc drive, and making the reflected light from the side surface of the head arm interfere with the condensed light beam to thereby form an interference light beam;

light receiving means for receiving said interference light beam and outputting bright and dark signals attributable to the relative displacement of said head arm;

condensed state detecting means for separating part of the reflected light from the side surface of said head arm from the optical path until said reflected light arrives at said light receiving means, and utilizing said separated light beam to detect the condensed state of the incident light beam onto the side surface of said head arm;

control means for positioning said interference optical system relative to said head arm by the utilization of the output of said condensed state detecting means, and positioning said head arm relative to said interference optical system by the utilization of the bright and dark signals from said light receiving means; and recording means for writing a servo track signal into the hard disc from the recording head of said head arm positioned by said control means.

20. The apparatus of claim 19, further comprising an opening member disposed in the optical path until the reflected light from the side surface of said head arm arrives at said light receiving means, and wherein said condensed state detecting means utilizes the reflected light from said opening member.

21. The apparatus of claim 20, further comprising a multimode laser diode, and wherein said interference optical system divides a light beam from said multimode laser diode, and said control means positions said interference optical system relative to said head arm so that the difference between the lengths of the respective optical paths in wave optics until two linearly polarized light beams divided by said interference optical system are combined together by said interference optical system may be within the coherent distance of said multimode laser diode.

22. An apparatus for recording information on a hard disc in a hard disc drive, comprising:

an interference optical system for condensing a light beam on a side surface of a head arm in a hard disc drive, and making the reflected light from the side surface of the head arm interfere with the condensed light to thereby form an interference light beam;

light receiving means for receiving said interference light beam and outputting bright and dark signals attributable to the relative displacement of said head arm;

observation means for separating part of the reflected light from said head arm from the optical path until said reflected light arrives at said light receiving means, and utilizing said separated light beam to make the condensed state of the incident light beam onto the side surface of said head arm observable;

control means for positioning said head arm relative to said interference optical system by the utilization of the bright and dark signals from said light receiving means; and recording means for writing a servo tack signal into the hard disc from the recording head of said head arm positioned by said control means.

* * * * *

UNITED STATES PATENT AND TRADEMARK OFFICE
CERTIFICATE OF CORRECTION

PATENT NO. : 6,618,218 B1
DATED : September 9, 2003
INVENTOR(S) : Hidejiro Kadowaki et al.

It is certified that error appears in the above-identified patent and that said Letters Patent is hereby corrected as shown below:

Title page,
Item [*] Notice, "0 days" should read -- Patent Term Extension 437 days --.

Column 3,
Line 25, "100, μm" should read -- 100 μm --.

Column 4,
Line 46, "0.5, μm" should read -- 0.5 μm --.

Column 5,
Line 33, "present day" should read -- present-day --.

Column 7,
Line 43, "25" should be deleted.

Column 11,
Line 7, "embodiments" should read -- embodiment --.
Line 41, "other" should read -- another --.

Signed and Sealed this

Twenty-eighth Day of September, 2004

JON W. DUDAS
*Director of the United States Patent and Trademark Office*